Nov. 25, 1941.　　　T. H. NORTH　　　2,263,587
PROJECTOR
Filed March 5, 1938　　　2 Sheets-Sheet 1
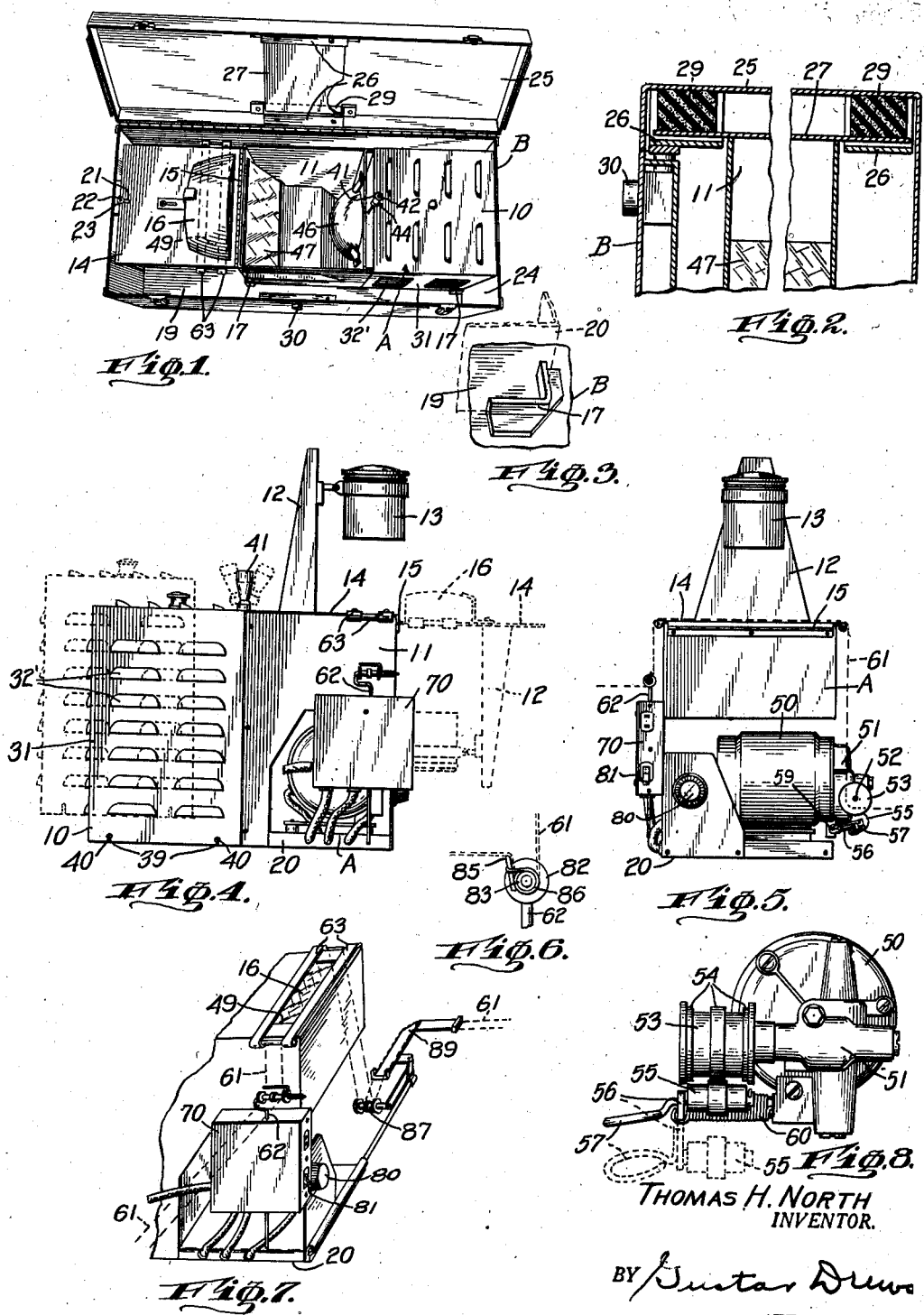
THOMAS H. NORTH
INVENTOR.
BY Gustav Drews
ATTORNEY Nov. 25, 1941.   T. H. NORTH   2,263,587
PROJECTOR
Filed March 5, 1938   2 Sheets-Sheet 2

THOMAS H. NORTH
INVENTOR.

BY Gustav Drews
ATTORNEY

Patented Nov. 25, 1941

2,263,587

UNITED STATES PATENT OFFICE 2,263,587

PROJECTOR

Thomas H. North, Bald Eagle, Minn., assignor to Trans-Lux Movie Ticker Corporation, New York, N. Y., a corporation of Delaware Application March 5, 1938, Serial No. 194,064

16 Claims. (Cl. 271—2.3)

This invention relates to an improvement in projectors of a type particularly designed for projection of news print tape which is derived at varying speed from a ticker or other mechanism. My invention also relates to a carrying case which is designed to contain the projector during transportation or shipping of the same.

It has been found that where projectors are used, these projectors will ordinarily remain in service for a considerable period of time without attention. However, from time to time it is desirable to repair or service the machines to keep them in proper working order, or to make changes and to add improvements to the machines. It is therefore highly desirable to provide a projector which may be installed with a minimum of effort and to so design the projector that it may be conveniently transported.

It is accordingly an object of the present invention to provide a projector which may be readily folded together into convenient form for shipping or transportation purposes, and which may accordingly be readily shipped or carried from one point to another. In accomplishing this object, it is a purpose of the invention to so design the projector that it may be folded into position for packing and shipping with a minimum of effort and in a simple manner, so that when the device is removed from the carrying or shipping container, it may be put into service with a minimum of effort.

It is a further object of this invention to provide a projector having a switch arrangement which will absorb the vibration of the tape at it is evolved from the ticker or other source of supply, so that when the tape is projected, the tape will move smoothly and freely for a period of time, and then come to rest for a period of time. This construction permits the vibratory movement of the ticker to be eliminated, making the projected image of the tape much more easily seen and read.

It is a purpose of this invention to provide a projector and carrying case for accommodating the projector. The projector is so designed as to fold into a substantially rectangular shape and the carrying case is provided with means of holding the projector in a definite position within the case. The case is also provided with a resilient clamping means designed so that the projector is resiliently held in the previously mentioned predetermined position during the time it is being transported. The case is so designed that the projector is clamped in position by the action of closing the container cover so that simultaneously with the closing of the container, the projector is clamped in place.

It is a purpose of this invention to provide a switch mechanism which will permit the tape to be pulled past the projection aperture for at least a predetermined distance before the switch is actuated to stop the tape pulling mechanism. This insures the steady movement of the tape past the aperture for at least a predetermined length each time the tape pulling mechanism starts into operation. This result is accomplished by providing a switch actuated by a suitable lever means which opens the switch when one length of loop is formed between the projector and the ticker, and which closes the switch when a shorter length of tape is provided between the projector and the ticker.

It is a further feature of my invention to provide a means engaging the loop of tape between the projector and ticker, which means is spring actuated in such a manner that the vibratory movement of the tape as it is ejected from the ticker is absorbed in the spring. Accordingly, with this construction, the tape pulling mechanism is only set into motion by a series of actuations of the ticker and will not operate momentarily after each movement of the tape ejected from the ticker.

These and other objects and novel features of the invention will be more clearly and fully set forth in the following specification and claims.

In the drawings forming a part of this specification:

Figure 1 is a top perspective view of my projector in folded position within the carrying case provided therefor.

Figure 2 is a sectional view of a portion of the carrying case, illustrating the manner in which the projector is clamped by the carrying case cover.

Figure 3 is a perspective detail view of one of the positioning lugs which holds the projector in proper position on the bottom of the carrying case.

Figure 4 is a side elevation view of my projector, illustrating in dotted outline the manner in which the lamp housing of the projector may be removed and the folded position of the top portion of the projector.

Figure 5 is a front elevation view of my projector, illustrating the path of the tape passing therethrough.

Figure 6 is a detail view of a portion of the switch mechanism.

Figure 7 is a perspective view of a portion of the front of my projector, illustrating the path of the tape over the aperture.

Figure 8 is a detail view of the tape pulling mechanism.

Figure 9:
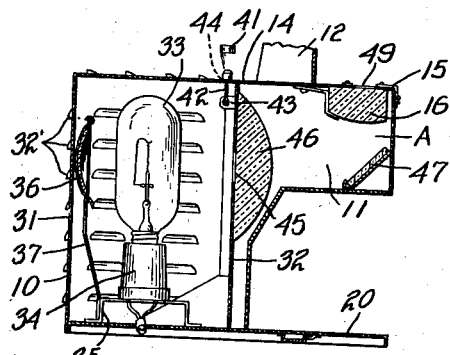
Figure 9 is a sectional view through the projector, with the tape pulling mechanism removed therefrom.

The projector A is formed as illustrated in Figure 4 of the drawings, and as may be seen in Figure 9 of the drawings. The projector A comprises a light chamber 10, a projection chamber 11, and a focusing lens supporting means 12. In order that the projector A may fit readily into the carrying case or container B, the projector may be positioned in the manner illustrated in Figures 1, 2 and 4 of the drawings. The focusing lens supporting member 12 supporting the lens 13, is mounted on the top 14 of the projecting chamber 11, and this top is hinged at 15 to the top of the projecting chamber. In order to fold the projector into a substantially rectangular mass, the top 14 is pivoted on its hinges 15 into the dotted position illustrated in Figure 4 of the drawings. One of the projecting lenses 16 is mounted on the top 14, and in folded position, this lens is exposed as may be seen in Figure 1 of the drawings.

When the projector A has been folded into the position illustrated in Figure 4, the projector may be inserted into the carrying case or container B. Angle members 17 are properly mounted on the base 19 of the carrying case B to engage the corners of the base 20 forming the bottom of the light and projector chambers 10 and 11. The projector is held in proper position within the case by these corners members 17. Furthermore, an edge of the top 14 of the projection chamber is slotted as disclosed at 21 and engages a stud 22 mounted on the carrying case B. A thumb nut 23 is provided on the stud 22 by means of which the top 14 may be supported in the folded position illustrated in dotted outline in Figure 4.

When the projector A has been inserted into the body portion 24 of the carrying case B, the top 25 hingedly secured to the body portion 24, is folded down over the machine. The top 25 is equipped with a pair of U-shaped straps 26 secured to the top 25. Within these straps 26 I provide a cross plate 27 which is urged against the closed ends of the strap 26 by sponge rubber cushions 29. The plate 27 engages the upper edges of the projection chamber 11 when the top 25 is folded down, compressing the resilient pads 29 to some extent and holding the projector A in position in the angles 17 on the base 19 of the carrying case B. A suitable locking mechanism 30 is provided which may be of any desired type.

The light chamber 10 is formed with a removable inclosure 31 which forms three sides of the chamber 10 and the top of the same. The remaining wall is formed by the partition 32 between the light chamber and the projection chamber. The inclosure 31 is provided with a series of louvers 32' to permit air to flow freely through the light chamber and to cause a circulation of air to permit the air heated by the lamp 33 to escape. The lamp 33 is mounted in a socket 34 upon a bracket 35, which in turn is secured to the base 20. A reflector 36 is mounted upon a suitable standard 37 extending from the bracket 35.

The inclosure 31 is marginally slotted as indicated in Figure 4 of the drawings, to permit the inclosure to be readily removed. Screws 39 extend through the slots 40 in the inclosure 31 to secure the inclosure to the base. When the screws 39 are loosened somewhat, the inclosure may be moved upwardly out of engagement with the base. The inclosure is normally held from upward movement by the thumb nut 41 which is threadably engaged on a pivoted eye-bolt 42 anchored within the light chamber 10 upon a bracket 43. The thumb nut 41 engages in a slot 44 in the edge of the inclosure 31 and also in a slot in the top 14 of the projection chamber. In normal position, it overlaps both the inclosure 31 and the top 14, holding these members both in proper position. By loosening the thumb nut 41, however, and pivoting the eye-bolt 42 in one direction or the other, either the top 14 or the inclosure 31 may be moved out of engaging position.

The partition 32 between the light chamber 10 and the projection chamber 11 is provided with an aperture 45 and a lens 46 is mounted on the partition wall 32 covering this aperture 45. The concentrated rays of light from the bulb or lamp 33 are projected against an inclined mirror 47 which reflects the rays of light through the lens 46 and through the aperture 49 in the top 14 over which the tape to be displayed is pulled. The projection chamber 11 is considerably smaller than the light chamber 10, as the lower part of the same is cut away to provide a space for the tape pulling mechanism.

The tape pulling mechanism includes a motor 50 equipped with a gear reduction mechanism 51. A shaft 52 extends from this gear reduction mechanism substantially at right angles to the axis of the motor armature. Upon this shaft is mounted a tape pulling roller 53 having raised tape engaging portions 54 which engage the tape in such a way as to grip the same firmly. An idle roller 55 is mounted upon an arm 56 equipped with an operating handle 57. The arm 56 is pivoted at 59 and the roller 55 is held in engagement with the tape pulling roller 53 by the coil spring 60. The idle roller 55 may be moved out of contact with the roller 53 into the dotted outline position illustrated in Figure 8 by increasing the spring tension of the spring 60 to some extent.

The projector A is adapted to receive tape as it is derived at varying speed from a source of supply, such as a stock ticker or the like printing on a narrow tape two longitudinally extending lines of printed matter, one including the letters and the other including the figures of quotations. The tape 61 coming from the ticker engages the upper extremity of a switch arm 62 in a manner which will be later more clearly described, extends upwardly over the top 14 of the projection chamber, passing over the aperture 49 therein. Guides 63 hold the tape in proper alinement while passing over the aperture 49.

Figure 15:
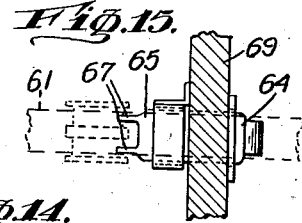
Figure 15 is a top plan view of a portion of the tape pulling mechanism.

From the top of the projection chamber the tape extends downwardly between the tape pulling rollers 53 and 55, and is expelled from the machine. This tape may drop directly into a suitable receptacle, not illustrated, or may, if desired, pass through a metal rectangular tube 64 passing between guides 65 and 66, which strip the tape from the rollers 53 and 55. The guides 65 and 66 may be provided with fingers 67 as illustrated in Figure 15, which engage the portions of the rollers 53 and 55 which are of smaller diameter than the remaining portions. In this way the tape may be ejected through a wall such as 69.

A switch mechanism is provided for operation of the tape pulling motor 50. This switch mechanism is inclosed in a switch box 70 mounted on the side of the projection chamber 11 and providing a bearing for the switch arm 62. The arm 62 is vertically journalled in the box 70 and a stud 71 secured to the arm 62 engages in a slide 72 on the inside of the box 70. The engagement of the stud 71 in the slide 72 holds the arm 62 against rotation.

A mercury switch 73 is supported by a bracket 74 which is pivoted at 75 to the box 70. A forked arm 76 is secured to the bracket 74 and this arm is provided with an elongated end 77. A counterweight 79 on the bracket 74 tends to balance the weight of the arm 77.

Figure 10:
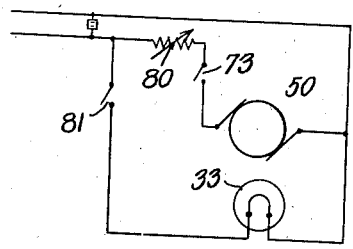
Figure 10 is a wiring diagram, illustrating the operating circuits for the projector lamp and motor.

The switch arm 62 is moved vertically by the action of the tape 61 passing beneath the same. The switch 73 is in circuit with the motor 50, as illustrated in Figure 10 of the drawings, a rheostat 80 being provided to vary the speed of the motor 50. The lamp 33 is in a parallel circuit to the motor 50 and is controlled by a switch 81 which is shown in Figure 11 mounted within the box 70.

Figure 11:
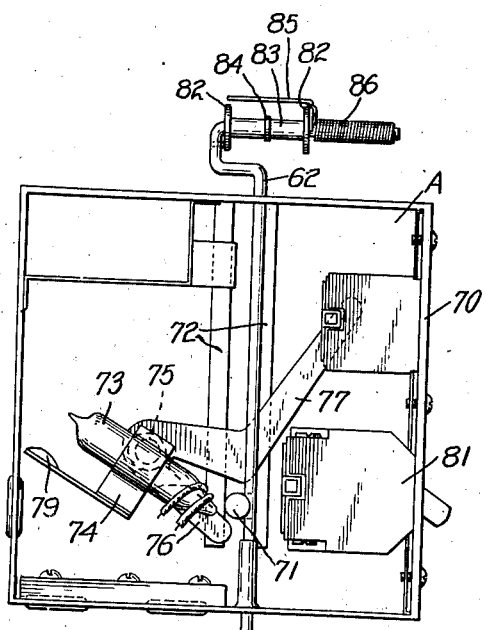
Figure 11 is a side elevation view of the motor switch, and the tape engaging member.

When the switch 73 is tilted in the position illustrated in Figure 11 of the drawings, the contacts within the switch 73 are closed, closing the circuit to the motor 50. The motor 50 starts into operation, pulling the tape 61 until the switch arm 62 is drawn upwardly so that the stud 71 engages the upper fork of the arm 76 gradually tilting the switch 73 into the position illustrated in Figure 12 of the drawings. It may be seen that any tendency for the motor to pull the tape a short distance after the switch 73 has been opened will be compensated for as the stud 71 will merely slide along the edge of the extended end 77 on the switch arm 76. The extended end 77 acts to hold the arm 76 from tilting back into the position illustrated in Figure 11.

Figures 12, 13:
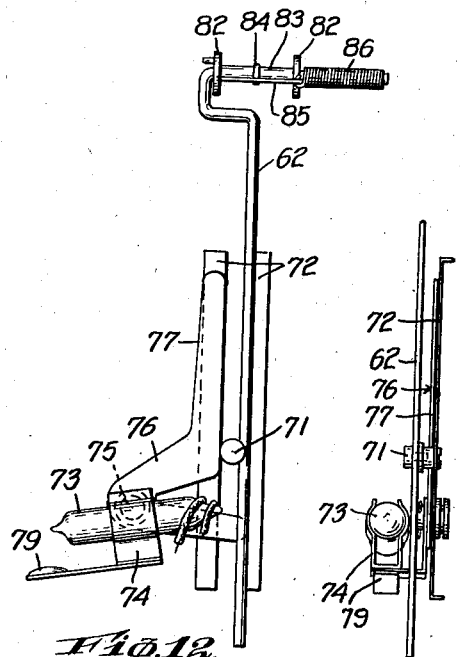
Figure 12 illustrates the motor switch in another position.
Figure 13 is a diagrammatic front elevation view of the motor switch.
Figure 14:
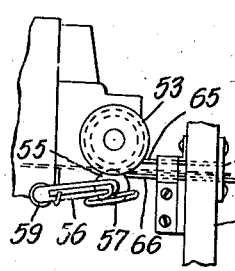
Figure 14 is a side elevation view of a portion of the tape pulling mechanism, showing the tape passing through a portion of the wall.

When the arm 62 is in the position illustrated in Fig. 12, and the ticker or tape source starts to operate, the arm 62 lowers until the stud 71 engages the lower fork of the arm 76 and the lowering of the arm 62 gradually tilts the switch 73 back into the position shown in Figure 11. It may be seen that the switch is so balanced that it must be urged in either direction by the stud 71.

The manner in which the tape engages the upper extremity of the arm or rod 62 is best illustrated in Figures 6, 11 and 12 of the drawings. The arm 62 is offset so that the center of the tape will approximately aline with the main portion of the arm 62. A pair of spaced shoulders 82 are mounted on the end of the arm 62, which shoulders are mounted upon a sleeve 83 rotatable on the arm 62. A central enlarged flange 84 engages the center of the tape to space the major portion thereof from the sleeve 83 to prevent injury to the figures and letters which have been printed thereupon which are printed in separate but parallel lines longitudinally of a narrow tape.

An arm 85 extends parallel with the sleeve 83 and is pivoted on the end of the arm 62 externally of the sleeve 83. This arm 85 is held in adjusted relationship with respect to the sleeve 83 by means of a light coil spring 86 on the extreme end of the arm 62. The tape 61, as it is derived from the ticker, extends over this arm 85 and beneath the sleeve 83, then extending upwardly over the top 14 of the projection chamber 11. The tape is somewhat taut due to the weight of the arm 62 and the arm 85 is rotated to some extent against the tension of the spring 86. When the ticker moves the tape slightly, the arm 85 rotates about the end of the arm 62, before the arm 62 drops. Thus short movements of the ticker tape are absorbed by the arm 85 which rotates just sufficiently to take up the small movement in the tape. When the arm 85 has rotated sufficiently to remove most of the tension in the spring 86, the arm 62 moves downwardly sufficiently to again create an increased tension in the tape 61 and thereby to pivot the arm 85, once again creating tension on the spring 86.

I have found that this tension mechanism operates to absorb the vibratory movement of the tape as it is evolved from the ticker so that the movement of the tape over the aperture 49 in the top 14 of the projection chamber, is smooth and continuous rather than short and jerky. Furthermore, the movement of the stud 71 between spaced limits before operating the switch 73, acts to create a continuous movement for a period of time and insures a steady movement of the tape for a predetermined appreciable minimum time before stopping the same. The tape therefore moves with a steady movement in steps and does not start up each time the ticker starts to operate.

If the tape 61 is to be pulled from a remote source, as might be the case if the tape is to be wound upon a reel, the tape pulling mechanism may be removed, see Fig. 7, and the idle roller 87 substituted therefor. From the roller 87, the tape extends over a turning device 89 which inverts the tape and simultaneously turns the same at right angles. The tape 61 then proceeds to the winding mechanism which includes a reel upon which the tape may be wound.

In accordance with the patent statutes, I have described the principles of construction and operation of my projector, and carrying case therefor, and while I have endeavored to set forth the best embodiment thereof, I desire to have it understood that this is only illustrative of a means of carrying out my invention and that obvious changes may be made within the scope of the following claims without departing from the spirit of my invention.

I claim:

1. Tape feeding means for a projection machine of the type in which a tape derived from a ticker is drawn across a support, said tape feeding means including a tape pulling mechanism, a motor for driving said tape pulling mechanism, a switch controlling said motor, and an arm engaging the tape controlling said switch, said arm including a second arm resiliently and rotatably mounted on said first arm with the tape forming an S-shaped loop passing over one arm and under the other arm before passing onto the tape pulling mechanism and a coil spring wound on said first arm and operatively associated with said second arm to render said second arm yieldable relative to said first arm, said second arm operable on increased tension in said tape to rotate under spring tension of said coil spring in one direction, and operable upon decreases in tension to rotate in the opposite direction.

2. The combination of tape feeding means for a projection machine of the type in which a tape derived from a ticker is drawn across a support, said tape feeding means including a tape pulling mechanism for pulling the tape across the support, a motor for driving said tape pulling mechanism, a switch controlling said motor, and an arm controlling said switch, said arm being vertically slidable adjacent to the entrance end of the support to operate said switch and at the same time dissipate the vibrations transmitted to the tape while being fed thereto, said arm including a second arm relatively rotatable with respect to said first arm, and means resiliently supporting said second arm to absorb slight variations in tension in said tape and cooperating with said first arm to dissipate the vibrations transmitted to the tape while being supplied.

3. Tape feeding means for a projection machine of the type in which a tape derived from a ticker is drawn across a support, said tape feeding means including a tape pulling means, control means including means engageable with the tape between the source of tape supply and the tape pulling means, means for slidably supporting said tape engaging means, switch means for controlling the tape pulling means, a pair of spaced arms operating said switch means, and means on said tape engaging means engageable with said arms, the movement of said tape engaging means operating one of said arms to open said switch, and movement of said tape engaging means in the opposite direction engaging the other of said arms to close said switch.

4. Tape feeding means for a projection machine of the type in which a tape derived from a ticker is drawn across a support, said tape feeding means including a tape pulling mechanism, control means for the tape pulling mechanism, said control means including a pivoted switch, a pair of spaced arms pivoted together with said switch, a tape engaging means engageable with the tape between said tape pulling mechanism and the ticker, and means on said tape engaging means engageable with said arms, movement of said tape engaging means in one direction causing engagement of said arm engaging means with one of said arms to pivot said switch in one direction, and movement of said tape engaging means in the opposite direction causing engagement of said arm engaging means with the other of said arms to pivot said switch in the opposite direction.

5. Tape feeding means for a projection machine of the type in which a tape derived from a ticker is drawn across a support, said tape feeding means including a tape pulling mechanism having a motor, a switch means for controlling said motor, said switch means including a tape engaging means, means for slidably supporting said tape engaging means, a pivoted switch element, spaced arm means secured to said switch element for pivoting the same, and means on said tape engaging means engageable with either of said arms to pivot said switch element in either direction.

6. A tape feeding means of the type in which a narrow tape having printed thereon in two separate but parallel lines the figures and letters of stock quotation with an intervening space between the figures and letters is drawn from the ticker as it is derived therefrom, said feeding means including a tape pulling mechanism for pulling the tape as it is derived from the ticker, said mechanism including a tape advancing roller having annular raised portions engaging the tape along the sides of the lines of printed matter but clearing the lines of printed matter, an idler having a medially extending raised portion to press the tape being advanced against one of the annular raised portions of said tape pulling roller, a discharging tube through which the tape is freely pushed by said advancing roller and idler, and a stripper for stripping the tape from said roller and idler including spaced fingers formed on the inner end of said tube extending into the depressions formed by the said raised portions and engaging the roller and idler to either side of the path of movement of the tape to enable the tape freely to pass through said tube.

7. Tape feeding means for a projection machine of the type in which a tape derived from a ticker is drawn across a support, said tape feeding means including tape pulling mechanism for pulling the tape across the support, a motor for driving said pulling mechanism, a switch controlling said motor, and an arm operatively associated with said switch for controlling the same, said arm being formed at the upper end of a rod vertically slidable adjacent to the entrance end of the support in a path of movement where the arm is well below the level of the support so that the tape will at all times maintain a bend of 90 degrees at the entrance of this support.

8. Tape feeding means for a projection machine of the type in which a tape derived from a ticker is drawn across a support, said tape feeding means including tape puller for pulling the tape across the support, and an arm for controlling the operation of said puller extending horizontally and resting on the tape at the entrance to the support, said arm being formed at the upper end of a rod vertically slidable adjacent to the entrance of a support in a path of movement well below the level of the support so that the tape will at all times maintain a bend of at least 90 degrees at the entrance to the support.

9. Tape feeding means of the type in which a tape derived from a ticker is drawn across a horizontally extending support, a tape puller for pulling an intermittently discharging tape across the support, a vertically slidable rod, an arm at the upper end of said rod engaging the tape and confined in its vertical movement with said rod well below the level of the support, a motor operatively connected for actuating said puller, an electric switch for controlling said motor having spaced abutments, and an abutment on said rod for engaging one of said spaced abutments to close said switch at one level of its movement and engaging the other of said spaced abutments to close said switch at another level of its movement.

10. Tape feeding means of the type in which a tape derived from a ticker is drawn across a horizontally extending support, a tape puller for pulling an intermittently discharging tape across the support, a vertically slidable rod, and arm at the upper end of said rod engaging the tape and confined in its vertical movement with said rod well below the level of the support, a motor operatively connected for actuating said tape puller a pivotally mounted electric switch for controlling said motor having spaced abutments, and an abutment on said rod for engaging one of said spaced abutments to rock said switch at one level of its movement to close said switch and for engaging the other of said spaced abutments to rock said switch at another level of its movement to open said switch.

11. Tape feeding means of the type in which a tape derived from a ticker is drawn across a horizontally extending support, a tape puller for pulling an intermittently discharging tape across the support, a vertically slidable rod, an arm at the upper end of said rod engaging the tape and confined in its vertical movement with said rod well below the level of the support, a motor operatively connected for actuating said tape puller, an electric switch for controlling said motor having abutting means, and an abutment on said rod for engaging said abutting means to close said switch at one level of its movement and for engaging said abutting means to open said switch at another level of its movement.

12. Tape feeding means of the type in which a tape derived from a ticker is drawn across a horizontally extending support, a tape puller for pulling an intermittently discharging tape across the support, a vertically slidable rod, an arm at the upper end of said rod engaging the tape and confined in its vertical movement with said rod well below the level of the support, a motor operatively connected for actuating said tape puller, and a pivotally mounted electric switch controlling said motor and having abutting means, and an abutment on said rod for engaging one of said abutting means to rock said switch at one level of its movement to close said switch for engaging said abutting means to rock said switch at another level of its movement to open said switch.

13. Tape feeding means of the type in which a tape derived from a ticker is drawn across a horizontally extending support, a tape puller for pulling an intermittently discharging tape across the support, a vertically slidable rod, an arm on said rod engaging the tape and confined in its vertical movement with said arm well below the level of the support, a motor operatively connected for actuating said puller, an electric switch for controlling said motor having spaced abutments, and an abutment on said rod for engaging one of said spaced abutments to close said switch at one level of its movement and engaging the other of said spaced abutments to close said switch at another level of its movement.

14. Tape feeding means of the type in which a tape derived from a ticker is drawn across a horizontally extending support, a tape puller for pulling an intermittently discharging tape across the support, a vertically slidable rod, an arm on said rod engaging the tape and confined in its vertical movement with said arm well below the level of the support, a motor operatively connected for actuaing said tape puller, a pivotally mounted electric switch for controlling said motor having spaced abutments, and an abutment on said rod for engaging one of said spaced abutments to rock said switch at one level of its movement to close said switch and for engaging the other of said spaced abutments to rock said switch at another level of its movement to open said switch.

15. Tape feeding means of the type in which a tape derived from a ticker is drawn across a horizontally extending support, a tape puller for pulling an intermittently discharging tape across the support, a vertically slidable rod, an element associated with said rod engaging the tape and confined in its vertical movement with said element well below the level of the support, a motor operatively connected for actuating said tape puller, an electric switch for controlling said motor having abutting means, and an abutment on said rod for engaging said abutting means to close said switch at one level of its movement and for engaging said abutting means to open said switch at another level of its movement.

16. Tape feeding means of the type in which a tape derived from a ticker is drawn across a horizontally extending support, a tape puller for pulling an intermittently discharging tape across the support, a vertically slidable rod, an element associated with said rod engaging the tape and confined in its vertical movement with said element well below the level of the support, a motor operatively connected for actuating said tape puller, and a pivotally mounted electric switch controlling said motor and having abutting means, and an abutment on said rod for engaging one of said abutting means to rock said switch at one level of its movement to close said switch and for engaging said abutting means to rock said switch at another level of its movement to open said switch.

THOMAS H. NORTH.